(12) United States Patent
Suzuki

(10) Patent No.: US 7,137,467 B2
(45) Date of Patent: Nov. 21, 2006

(54) STRADDLE TYPE VEHICLE

(75) Inventor: Yasuhito Suzuki, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 53 days.

(21) Appl. No.: 11/107,576

(22) Filed: Apr. 15, 2005

(65) Prior Publication Data

US 2005/0279555 A1    Dec. 22, 2005

(30) Foreign Application Priority Data

Apr. 20, 2004    (JP)    ............................. 2004-124660

(51) Int. Cl.
*B62K 11/00*    (2006.01)

(52) U.S. Cl. ...................... 180/219; 180/210; 180/908; 303/51.4; 188/181 A (58) Field of Classification Search ................ 180/219, 180/210, 908; 303/51.4; 188/181 A
See application file for complete search history.

(56) References Cited

U.S. PATENT DOCUMENTS

| | | |
|---|---|---|
| 4,002,084 A | 1/1977 | Martins et al. |
| 4,492,284 A * | 1/1985 | Hayashi ...................... 180/219 |
| 4,494,800 A * | 1/1985 | Hayashi ...................... 303/9.64 |
| 4,702,339 A * | 10/1987 | Hayashi et al. ............. 180/219 |
| 4,923,027 A * | 5/1990 | Hayashi et al. ............. 180/219 |
| 5,211,256 A * | 5/1993 | Muramatsu ................. 180/219 |
| 5,257,856 A * | 11/1993 | Ota et al. .................... 303/198 |
| 5,476,162 A | 12/1995 | Reed et al. |
| 5,620,237 A * | 4/1997 | Iwashita et al. ........... 303/9.64 |
| 6,478,103 B1* | 11/2002 | Matsuura .................... 180/90.6 |
| 6,481,080 B1* | 11/2002 | Monson ..................... 29/401.1 |
| 6,938,714 B1* | 9/2005 | Misaki et al. .............. 180/90.6 |
| 7,028,818 B1* | 4/2006 | James ........................ 188/344 |
| 2003/0061897 A1 | 4/2003 | Kenichi et al. |

FOREIGN PATENT DOCUMENTS

JP    04-031188    2/1992

* cited by examiner

*Primary Examiner*—Lesley D. Morris
*Assistant Examiner*—Marlon Arce-Diaz
(74) *Attorney, Agent, or Firm*—Keating & Bennett, LLP (57) ABSTRACT

A straddle type vehicle having an improved external appearance includes a connecting rod, the movement of which can be detected reliably by an input section of a brake switch. A structure around a brake switch of a straddle type vehicle including a foot rest disposed on the front portion side of a crankcase, a brake pedal having a rotational axis near the foot rest, a master cylinder capable actuating a brake by pressing a pressurization section, a connecting rod connecting a turnable operation section of the brake pedal and the master cylinder and capable of pressurizing the pressurization section through turning movement of the brake pedal, and a brake switch capable of lighting up a brake lamp through detection of the movement of the connecting rod by an input section, wherein the master cylinder is fixed on the rear portion side of the crankcase, and the input section of the brake switch is disposed near the master cylinder.

10 Claims, 5 Drawing Sheets

STRADDLE TYPE VEHICLE

BACKGROUND OF THE INVENTION

1. Field of the Invention

The present invention relates to a straddle type vehicle in which a foot rest is disposed on a front portion side of the crankcase of an engine and the rotational axis of a brake pedal is disposed near the foot rest.

2. Description of the Related Art

Conventionally, there has been known a straddle type vehicle in which a foot rest is disposed on a front portion side of the crankcase of an engine and the rotational axis of a brake pedal is disposed near the foot rest.

A braking device of the straddle type vehicle is arranged such that a master cylinder is fixed above the brake pedal disposed near the foot rest, a pressurization section of the master cylinder and a turnable operation section provided in the brake pedal are connected by a connecting rod, and a hydraulic pressure of the master cylinder is transmitted to a body of the braking device that is provided in a rear wheel.

During a braking operation, pressing the brake pedal causes the turnable operation section thereof to rotate, the rotation of the turnable operation section causes the connecting rod to move in its axial direction to thereby pressurize the pressurization section of the master cylinder, and hydraulic pressure of the master cylinder causes the body of the braking device to actuate whereby braking of the rear wheel is effected.

In many straddle type vehicles, a brake switch that is capable of mechanically detecting an axial movement of the connecting rod is disposed near the connecting rod, and when the body of the braking device is actuated, a brake lamp provided at the rear portion of the straddle type vehicle is lit up through the brake switch.

In such straddle type vehicles, since the brake lamp should be lit up at a time when braking of the rear wheel begins, a specified moment in the movement of the connecting rod needs to be detected accurately by the brake switch.

However, the turnable operation section of the brake pedal turns about the rotational axis of the brake pedal. Therefore, during the turning movement of the brake pedal, the connecting rod swings about the fixed master cylinder as a fulcrum while moving in the axial direction, so that axial movement of the connecting rod cannot be detected easily by the brake switch mechanically with high accuracy.

Therefore, in Japanese Utility Model Hei 4-31188 (hereinafter referred to as Patent Document 1), a yoke for connecting a push rod as a connecting rod and a turnable operation section of a brake pedal is arranged such that the push rod is formed with an axial mounting hole and a brake switch is attached to the push rod, whereby the axial movement can be detected reliably and accurately even if the push rod swings.

However, in such a conventional structure around the brake switch, the master cylinder and the brake switch are disposed near the brake pedal. In a straddle type vehicle such as a so-called American type motorcycle in which a foot rest is provided on a front portion side of the crankcase, the master cylinder, the brake switch and the like are likely to be exposed to the front of the vehicle and visible from the outside, raising a problem of lowering the quality of external appearance of the straddle type vehicle.

In addition, in a vehicle in which the brake switch is attached to the yoke of the connecting portion between the connecting rod and the turnable operation section of the brake pedal as described in the above-described Patent Document 1, numerous functions are given to the yoke, so that the structure is complicated.

SUMMARY OF THE INVENTION

In order to overcome the problems described above, preferred embodiments of the present invention provide a straddle type vehicle in which a master cylinder and a brake switch are difficult to see from the outside, while a brake lamp can be lit up exactly and correctly with a simple construction.

A straddle type vehicle according to a preferred embodiment of the present invention includes a vehicle body frame, an engine mounted on the vehicle body frame and having a crankshaft disposed laterally of the vehicle, a foot rest, a brake arranged to brake a wheel, a brake pedal arranged to rotate about a rotational axis located near the foot rest, a master cylinder arranged to actuate the brake, a connecting rod connecting one end of the brake pedal and the master cylinder, an input section arranged to detect an axial movement of the connecting rod, and a brake switch arranged to light up a brake lamp according to a detection signal detected by the input section, wherein the rotational axis of the brake pedal is located before the rotational axis of the crankshaft of the engine, and the master cylinder is disposed after the rotational axis of the crankshaft of the engine.

A straddle type vehicle according to another preferred embodiment of the present invention includes a vehicle body frame, an engine mounted on the vehicle body frame, a foot rest disposed on a front portion side of a crankcase of the engine, a brake arranged to brake a wheel, a brake pedal having a turnable operation section arranged to rotated about a center of rotational axis located near the foot rest of the vehicle body frame, a master cylinder including a pressurization section arranged to pressurize the pressurization section to actuate the brake, a connecting rod arranged to connect the turnable operation section and the pressurization section of the master cylinder and to pressurize the pressurization section, an input section arranged to detect an axial movement of the connecting rod, and a brake switch arranged to light up a brake lamp according to a detection signal detected by the input section, wherein the master cylinder is fixed to the vehicle body frame on a rear portion side of the crankcase, and the input section of the brake switch is disposed near the master cylinder.

The connecting rod preferably includes an operative piece protruding radially, and as a result of axial movement of the connecting rod during operation of the brake pedal, the brake switch lights up the brake lamp, with the operative piece pressing the input section.

The connecting rod preferably includes a first rod section connected to the pressurization section of the master cylinder, a second rod section connected to the turnable operation section of the brake pedal, and an operative rod section which connects the first rod section and the second rod section and includes the operative piece, and one end of the operative rod section and the first rod section are screwed to engage each other to adjust the total length of the operative rod section and the first rod section, and the other end of the operative rod section and the second rod section are screwed to engage each other to adjust the total length of the operative rod section and the second rod section.

The vehicle body frame preferably has a slanting section extending obliquely downwardly toward the rear of the vehicle and a horizontal section extending approximately horizontally from the slanting section toward the rear of the vehicle, wherein the connecting rod is disposed along the horizontal section of the vehicle body frame.

The vehicle body frame also preferably has a muffler disposed laterally of the vehicle body frame approximately horizontally, wherein the master cylinder or the brake switch is disposed between the horizontal section of the vehicle body frame and the muffler.

The engine is preferably mounted having the crankshaft disposed laterally of the vehicle, the rotational axis of the brake pedal is disposed in front of the rotational axis of the crankshaft, and the master cylinder is disposed behind the rotational axis of the crankshaft of the engine. Therefore, a bank angle of the vehicle can be secured and the longer connecting rod can be allowed for connecting the turnable operation section of the brake pedal and the pressurization section of the master cylinder.

The foot rest is preferably disposed on a front portion side of the crankcase, the rotational axis of the brake pedal is disposed near the foot rest, and the master cylinder is fixed on a rear side portion of the crankcase. Therefore, the longer connecting rod can be allowed for connecting the turnable operation section of the brake pedal and the pressurization section of the master cylinder.

Therefore, in various preferred embodiments of the present invention, the rotation of the brake pedal rotates the turnable operation section. Therefore, the swinging angle of the connecting rod can be kept small even when the connecting rod at the side of the turnable operation section of the brake pedal is moved in a radial direction of the connecting rod to a large extent. As a result, the radial movement of the connecting rod at the side of the master cylinder can be kept small and the axial movement of the connecting rod can be detected accurately by the input section of a brake switch disposed near the master cylinder, enabling the brake lamp to be lit up accurately with a simple construction.

Further, since the master cylinder and the brake switch are disposed behind the crankcase, they are difficult to see from the outside in front of the straddle type vehicle, thereby improving the quality of the external appearance thereof.

The connecting rod is preferably arranged such that it has a first rod section connected to the pressurization section of the master cylinder, a second rod section connected to the turnable operation section of the brake pedal, and an operative rod section which connects the first rod section and the second rod section and includes an operative piece for operating the brake switch, and one end of the operative rod section and the first rod section are screwed to engage each other so that the total length of the operative rod section and the first rod section is adjustable, and the other end of the operative rod section and the second rod section are screwed to engage each other so that the total length of the operative rod section and the second rod section is adjustable. Therefore, if the total length of the first rod section and the operative rod section is adjusted, the positional relationship between the operative piece of the operative rod section and the input section of the brake switch can be adjusted, and if the total length of the operative rod section and the second rod section is adjusted, the height of the brake pedal from the foot rest can be adjusted without the need to change the positional relationship between the operative piece of the operative rod and the input section of the brake switch.

Therefore, when adjustment of the height of the brake pedal is performed, with the brake lamp accurately adjusted for lighting, the height of the brake pedal can be adjusted easily without the need to perform readjustment of the brake switch.

The vehicle body frame preferably has a slanting section extending obliquely downward toward the rear of the vehicle and a horizontal section extending approximately horizontally from the slanting section toward the rear of the vehicle, and the connecting rod is disposed along the horizontal section of the vehicle body frame. Each member can be therefore supported by the horizontal section and the connecting rod can be disposed easily.

According to another preferred embodiment of the present invention, the vehicle body frame having the slanting section extending obliquely downward toward the rear of the vehicle and the horizontal section extending rearward and approximately horizontally from the slanting section includes a muffler disposed laterally of the vehicle body frame approximately horizontally, and a master cylinder or a brake switch is disposed between the horizontal section of the vehicle body frame and the muffler. Thus, these elements are more difficult to be viewed from the outside and the master cylinder or the brake switch can be protected from stones, debris or other objects that may be kicked up during operation and driving.

Other features, elements, characteristics and advantages of the present invention will become more apparent from the following detailed description of preferred embodiments thereof with reference to the attached drawings.

DETAILED DESCRIPTION OF PREFERRED EMBODIMENTS

Preferred embodiments of the invention will be described with reference to accompanying drawings.

FIG. 1 to FIG. 4 show a straddle type vehicle according to a preferred embodiment of the present invention.

Figure 1:
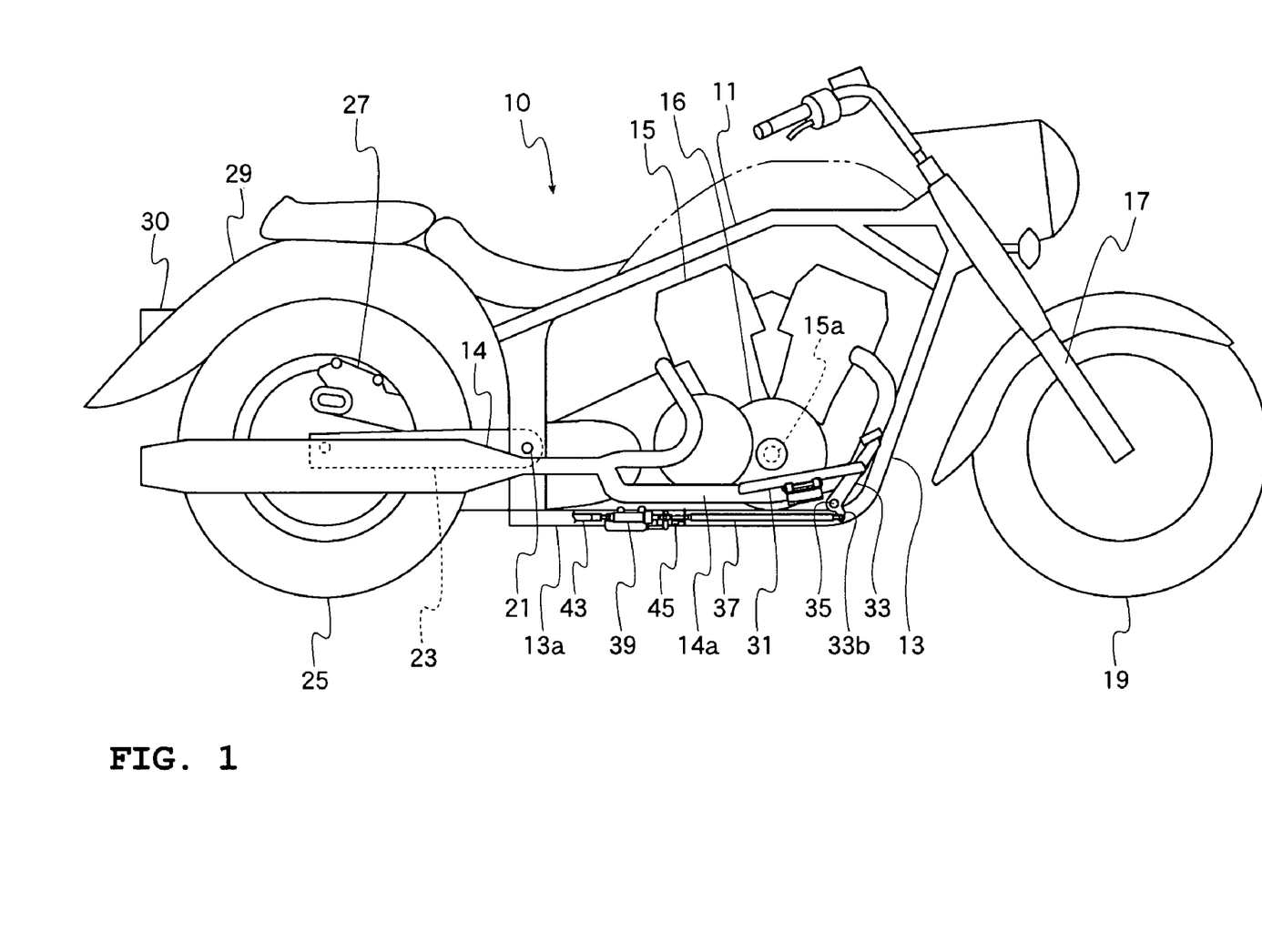
FIG. 1 is a side view of a motorcycle to which a structure around a brake switch according to a preferred embodiment of the present invention is applied.

FIG. 1 shows a so-called American type motorcycle that is equipped with a structure around a brake switch according to a preferred embodiment of the present invention.

In the motorcycle 10, an engine 15 having a crankshaft 15a disposed laterally of the vehicle is mounted on a horizontal section 13a of a down tube 13 of a vehicle body frame 11, a front fork 17 and a front wheel 19 are disposed on a front portion side of the vehicle body frame 11, a rear arm 23 is connected for swinging movement to the vehicle body frame 11 behind by a pivotal shaft 21, and a rear wheel 25 is supported on the rear arm 23. Also, a body 27 of a braking device is mounted to the rear wheel 25, and a brake lamp 30, which is lit when the body 27 of the braking device is actuated, is mounted to a rear fender 29 disposed above the rear wheel 25. Further, laterally of the horizontal section 13a of the down tube 13 of the vehicle body frame 11 is disposed a horizontal section 14a of a muffler 14 connected to the engine 15.

Figure 2:
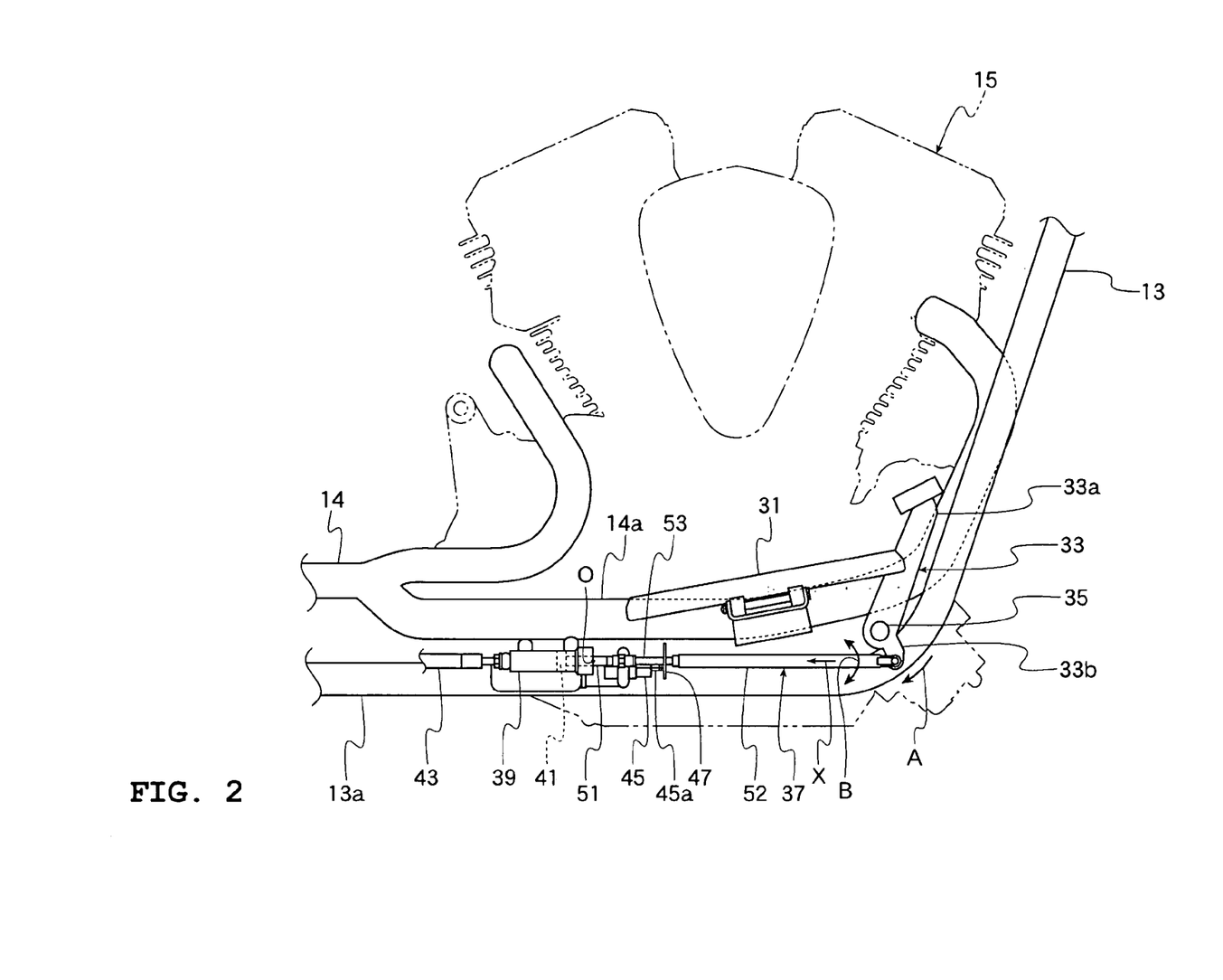
FIG. 2 is a side view showing in detail the structure around a brake pedal of according to a preferred embodiment of the present invention.
Figure 3:
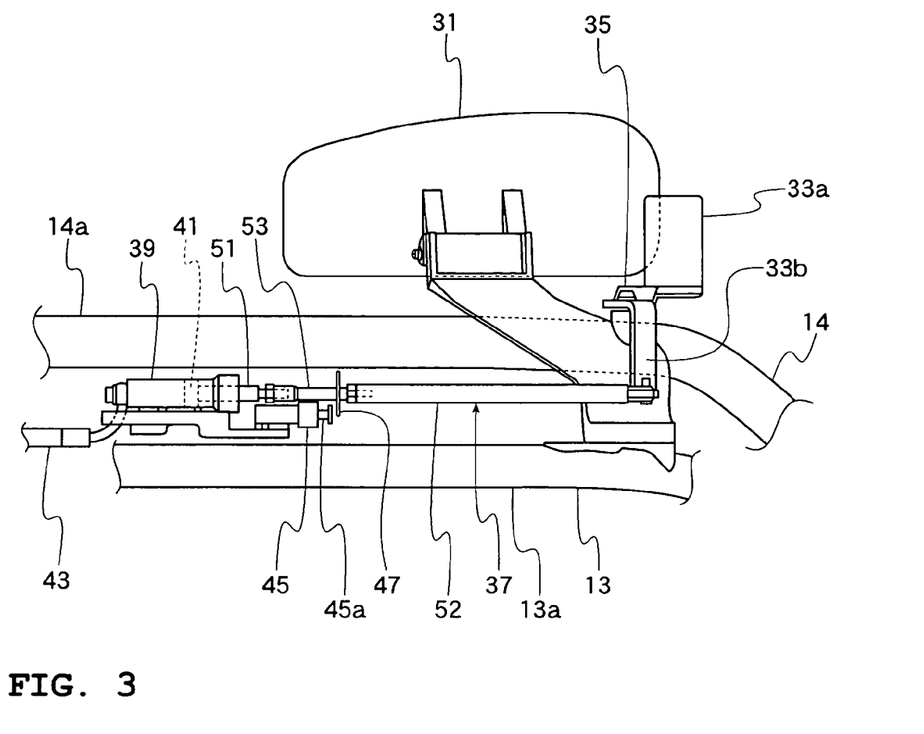
FIG. 3 is a bottom view around the brake switch according to a preferred embodiment of the present invention.

In this motorcycle 10, as shown in FIG. 2 and FIG. 3, a foot rest is provided on the front portion side of and laterally of a crankcase 16 of the engine 15, and a brake pedal 33 for actuating the body 27 of the braking device for the rear wheel 25 is provided near the foot rest 31.

The brake pedal 33 has a turning shaft 35 as a rotational axis, that is located on the front side of, below and near the foot rest 31, an operating section 33a is arranged to protrude upward of the foot rest 31, and a turnable operation section 33b is provided near the turning shaft 35. Here, the turning shaft 35 is located in front of the crankshaft 15a of the engine 15 and when the operating section 33a is pressed, the brake pedal 33 turns about the turning shaft 35, so that the turnable operation section 33b is rotated in the direction of arrow A.

The turnable operation section 33b of the brake pedal 33 is connected to a master cylinder 39 through a connecting rod 37.

The master cylinder 39 is located and secured on the rear portion side of and below the crankcase 16 near the pivotal shaft 21 which is located behind the crankshaft 15a of the engine 15, at a position between the horizontal section 13a of the down tube 13 of the vehicle body frame 11 and the horizontal section 14a of the muffler 14, and pressurization of the inside of a pressurization section 41 allows hydraulic pressure to be supplied to the body 27 of the braking device through an oil pipe 43. The connecting rod 37 is connected to the pressurization section 41, and when the brake pedal 33 is rotated, the connecting rod 37 is moved in the axial direction X, allowing the body 27 of the braking device to be actuated.

In addition, near the master cylinder 39 is disposed a brake switch 45 for lighting up the brake lamp 30 when the body 27 of the braking device is actuated. The brake switch 45 is provided with an input section 45a for turning on the brake switch and lighting up the brake lamp 30 when pressed, and the input section 45a is disposed adjacent to the connecting rod 37 near the master cylinder 39.

The connecting rod 37 is disposed approximately horizontally along the horizontal section 13a of the down tube 13 and provided with a disc-like operative piece 47 protruding radially along the circumference of the connecting rod 37, to actuate the input section 45a of the brake switch 45, and the movement of the connecting rod 37 in the X direction causes the operative piece 47 to move, allowing the input section 45a to be pressed.

Figure 4:
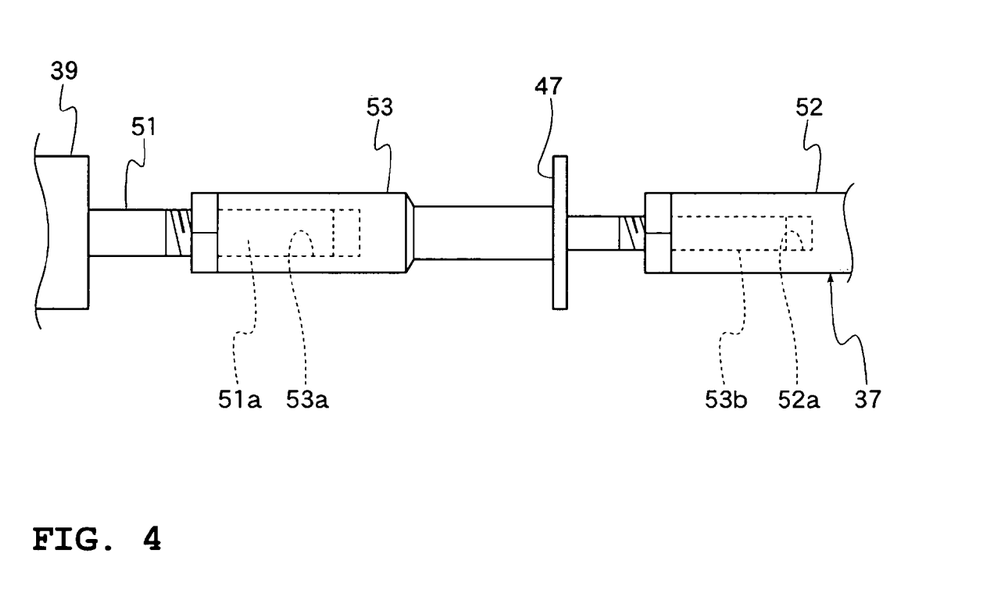
FIG. 4 is a side view of a connecting rod according to a preferred embodiment of the present invention.

In this preferred embodiment, the connecting rod 37 has, as shown in FIG. 4, a first rod section 51 connected to the pressurization section 41 of the master cylinder 39, a second rod section 52 connected to the turnable operation section 33b of the brake pedal 33, and an operating rod section 53 connecting the first rod section 51 and the second rod section 52 and provided with the operative piece.

The operating rod section 53 and first rod section 51 are provided, at their opposing ends, with a female screw section 53a and a male screw section 51a in the axial direction, respectively, and the female screw section 53a and the male screw section 51a engage each other, so that the operating rod section 53 and the first rod section 51 are connected together.

The operating rod section 53 and the second rod section 52 are also provided, at their opposing ends, with a male screw section 53b and a female screw section 52a in the axial direction, and the male screw section 53a and the female screw section 52a engage each other, so that the operating rod section 53 and the second rod section 52 are connected together.

Here, adjustment of the amount of engagement between the female screw section 53a and the male screw section 51a allows the total length of the operating rod section 53 and the second rod section 52 to be changed, and adjustment of the amount of engagement between the male screw section 53b and the female screw section 52a allows the total length of the operating rod section 53 and the first rod section 51 to be changed.

In the motorcycle having the unique construction described above, the foot rest 31 is disposed on the front portion side of the crankcase 16, the rotational axis 35 of the brake pedal 33 is disposed near the foot rest 31 in front of the crankshaft 15a of the engine 15, and the master cylinder 39 is fixed on the rear portion side of the crankcase 16 behind the crankshaft 15a of the engine 15. Therefore, the bank angle of the motorcycle can be secured, and a longer connecting rod 37 can be provided for connecting the turnable operation section 33b of the brake pedal 33 and the pressurization section 41 of the master cylinder 39, compared with when the master cylinder and the brake switch 45 are disposed below or over and near the foot rest 31.

Thus, when the brake pedal 33 is pressed to rotate and the turnable operation section 33b is rotated in the direction of arrow A in FIG. 2, the connecting rod 37 swings in the direction of arrow B, about the point O at the end of the master cylinder 39 as a fulcrum, so that even when the connecting rod 37 moves up and down to a large extent in the region near the turnable operation section 33b of the brake pedal 33, the swinging angle of the connecting rod 37 can be kept small by an increase of the length of the connecting rod 37.

As a result, up and down movement of the connecting rod 37 in the region near the master cylinder 39 can be kept small, allowing accurate detection of the movement of the connecting rod 37 in the X direction by the input section 45a of the brake switch 45 disposed near the master cylinder 39. Therefore, with such a simple construction, the brake lamp 30 can be lit up accurately at the time braking of the rear wheel 25 begins.

Further, since the master cylinder 39 and the brake switch 45 are disposed on the rear portion side of the crankcase 16, they are difficult to see from the front side of the motorcycle 10, thereby improving the quality in external appearance thereof.

Further, the connecting rod 37 is arranged such that it has a first rod section 51 connected to the pressurization section 41 of the master cylinder 39, a second rod section 52 connected to the turnable operation section 33b of the brake pedal 33, and an operating rod section 53 connecting the first rod section 51 and the second rod section 52 and including an operative piece 47 for operating the brake switch 45, and one end of the operating rod section 53 and the first rod section 51 are screwed to engage each other so that the total length of the operating rod section 53 and the first rod section 51 is adjustable and the other end of the operating rod section 53 and the second rod section 52 are screwed to engage each other so that the total length of the operating rod section 53 and the second rod section 52 is adjustable. Therefore, when the total length of the first rod section 51 and the operating rod section 53 is first adjusted, the positional relationship between the operative piece 47 of the operating rod section 53 and the input section 45a of the brake switch 45 can be adjusted accurately. As a result, even if errors occur in assembling the brake pedal 33, the master cylinder 39, the brake switch 45 and other elements, the position of the operative piece 47 of the connecting rod 37 can be adjusted so as to be detected accurately by the input section 45*a* of the brake switch 45.

In addition, if adjustment of the total length of the second rod section 52 and the operating rod section 53 is performed, the position of the operating section 33*a* of the brake pedal 33 from the foot rest 31 can be adjusted at any height without need to change the positional relationship between the operative piece 47 and the input section 45*a* of the brake switch 45.

Therefore, when adjustment of the height of the operating section 33*a* of the brake pedal 33 is performed, with the brake lamp 30 accurately adjusted for lighting, the height of the operating section 33*a* of the brake pedal 33 can be adjusted easily without need of performing readjustment of the brake switch 45.

Further, since the connecting rod 37 is disposed along the horizontal section 13*a* of the down tube 13 of the vehicle body frame 11, elements such as the brake pedal 33, the connecting rod 37, the master cylinder 39, the brake switch 45 and the like can be supported easily on the horizontal section 13*a*, facilitating disposition of each member even when the connecting rod 37 is long.

Further, since the master cylinder 39 and the brake switch 45 are disposed between the horizontal section 13*a* of the down tube 13 and the horizontal section 14*a* of the muffler 14, they are more difficult to see from the outside, and the master cylinder 39 and the brake switch 45 can be protected from stones and the like which come flying during running, by the horizontal section 13*a* of the down tube 13 and the horizontal section 14*a* of the muffler 14.

Although in the above-described preferred embodiment, the brake switch 45 is described as a device for detecting the movement of the connecting rod 37 when the input section 45*a* is pressed, other types of brake switches can be used, as the case may be, such as a device in which detection is made when the input section is pulled, a non-contact type device, and the like.

Figure 5:
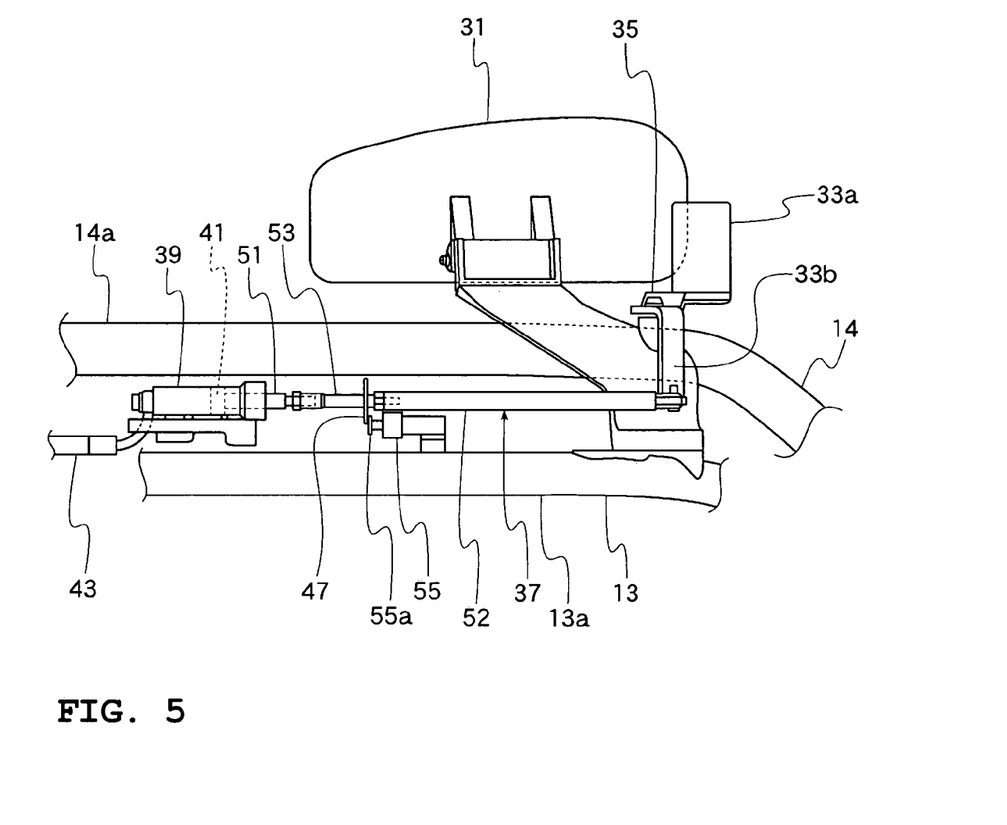
FIG. 5 is a bottom view, showing a modification of a preferred embodiment of the present invention.

For example, there may be used a brake switch 55 as a variation, as shown in FIG. 5, which stays "off" while an input section 55*a* is depressed and turns "on" when the input section 55*a* is extended. Here, the brake switch 55 is mounted in the opposite direction to the above-described preferred embodiment. In a normal condition, the input section 55*a* is pressed by the operative piece 47 of the connecting rod 37, and when the brake pedal 37 is pressed to be moved toward the connecting rod 37, the input section 55*a* extends so that the brake lamp 30 can be lit.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A straddle type vehicle comprising:
    a vehicle body frame;
    an engine mounted on the vehicle body frame and having a crankshaft disposed laterally of the vehicle;
    a foot rest;
    a brake arranged to brake a wheel;
    a brake pedal arranged to rotate about a rotational axis located near said foot rest;
    a master cylinder arranged to actuate said brake;
    a connecting rod arranged to connect one end of said brake pedal and the master cylinder;
    an input section arranged to detect an axial movement of said connecting rod; and
    a brake switch arranged to light up a brake lamp according to a detection signal detected by the input section; wherein
    the rotational axis of said brake pedal is located before the rotational axis of said crankshaft of said engine; and
    said master cylinder is disposed after the rotational axis of said crankshaft of said engine.

2. The straddle type vehicle of claim 1, wherein said connecting rod includes an operative piece protruding radially, and as a result of axial movement of said connecting rod during operation of said brake pedal, said brake switch lights up said brake lamp, with said operative piece pressing said input section.

3. The straddle type vehicle of claim 2, wherein said connecting rod includes a first rod section connected to said master cylinder, a second rod section connected to said brake pedal, and an operative rod section which connects said first rod section and said second rod section and includes said operative piece, and one end of said operative rod section and said first rod section are screwed to engage each other for the adjustment of the total length of said operative rod section and said first rod section, and the other end of said operative rod section and said second rod section are screwed to engage each other for the adjustment of the total length of said operative rod section and said second rod section.

4. The straddle type vehicle of claim 1, wherein said vehicle body frame includes a slanting section extending obliquely downward toward the rear of the vehicle and a horizontal section extending approximately horizontally from the slanting section toward the rear of the vehicle, wherein said connecting rod is disposed along said horizontal section of said vehicle body frame.

5. The straddle type vehicle of claim 1, wherein the vehicle body frame includes a slanting section extending obliquely downward toward the rear of the vehicle and a horizontal section extending rearward and approximately horizontally from the slanting section, and a muffler disposed laterally of said vehicle body frame approximately horizontally, wherein said master cylinder or said brake switch is disposed between said horizontal section of said vehicle body frame and said muffler.

6. A straddle type vehicle comprising:
    a vehicle body frame;
    an engine mounted on the vehicle body frame;
    a foot rest disposed on a front portion side of a crankcase of said engine;
    a brake arranged to brake a wheel;
    a brake pedal having a turnable operation section arranged to rotate about a rotational axis located near said foot rest of said vehicle body frame;
    a master cylinder including a pressurization section arranged to pressurize the pressurization section to actuate said brake;
    a connecting rod arranged to connect said turnable operation section and said pressurization section of said master cylinder and to pressurize said pressurization section;
    an input section arranged to detect an axial movement of the connecting rod; and
    a brake switch arranged to light up a brake lamp according to a detection signal detected by said input section; wherein
    said master cylinder is fixed to said vehicle body frame on a rear portion side of said crankcase; and
    said input section of said brake switch is disposed near said master cylinder.

7. The straddle type vehicle of claim 6, wherein said connecting rod includes an operative piece protruding radially, and as a result of axial movement of said connecting rod during operation of said brake pedal, said brake switch lights up said brake lamp, with said operative piece pressing said input section.

8. The straddle type vehicle of claim 7, wherein said connecting rod includes a first rod section connected to said pressurization section of said master cylinder, a second rod section connected to said turnable operation section of said brake pedal, and an operative rod section which connects said first rod section and said second rod section and includes said operative piece, and one end of said operative rod section and said first rod section are screwed to engage each other for the adjustment of the total length of said operative rod section and said first rod section, and the other end of said operative rod section and said second rod section are screwed to engage each other for the adjustment of the total length of said operative rod section and said second rod section.

9. The straddle type vehicle of claim 6, wherein said vehicle body frame includes a slanting section extending obliquely downward toward the rear of the vehicle and a horizontal section extending approximately horizontally from the slanting section toward the rear of the vehicle, wherein said connecting rod is disposed along said horizontal section of said vehicle body frame.

10. The straddle type vehicle of claim 6, wherein the vehicle body frame includes a slanting section extending obliquely downward toward the rear of the vehicle and a horizontal section extending rearward and approximately horizontally from the slanting section, and a muffler disposed laterally of said vehicle body frame approximately horizontally, wherein said master cylinder or said brake switch is disposed between said horizontal section of said vehicle body frame and said muffler.

* * * * *